(12) United States Patent
Natanzon et al.

(10) Patent No.: US 8,898,112 B1
(45) Date of Patent: Nov. 25, 2014

(54) WRITE SIGNATURE COMMAND

(75) Inventors: Assaf Natanzon, Ramat-Gan (IL);
Dennis T. Duprey, Raleigh, NC (US);
Leehod Baruch, Rishon Leziyon (IL);
Karl M. Owen, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/226,546

(22) Filed: Sep. 7, 2011

(51) Int. Cl.
*G06F 7/00* (2006.01)
*G06F 17/00* (2006.01)

(52) U.S. Cl.
USPC .......................... 707/634; 707/646

(58) Field of Classification Search
USPC .................. 707/634, 639, 640, 641, 656, 646
See application file for complete search history.

(56) References Cited

U.S. PATENT DOCUMENTS

| | | | |
|---|---|---|---|
| 5,170,480 A | 12/1992 | Mohan et al. | |
| 5,388,254 A | 2/1995 | Betz et al. | |
| 5,499,367 A | 3/1996 | Bamford et al. | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |
| 6,574,657 B1 | 6/2003 | Dickinson | |
| 6,621,493 B1 | 9/2003 | Whitten | |
| 6,804,676 B1 | 10/2004 | Bains, II | |
| 6,947,981 B2 | 9/2005 | Lubbers et al. | |
| 7,043,610 B2 | 5/2006 | Horn et al. | |
| 7,076,620 B2 | 7/2006 | Takeda et al. | |
| 7,103,796 B1 * | 9/2006 | Kekre et al. | 714/6.31 |
| 7,111,197 B2 | 9/2006 | Kingsbury et al. | |
| 7,117,327 B2 | 10/2006 | Hirakawa et al. | |
| 7,120,768 B2 | 10/2006 | Mizuno et al. | |
| 7,130,975 B2 | 10/2006 | Suishu et al. | |
| 7,139,927 B2 | 11/2006 | Park et al. | |
| 7,159,088 B2 | 1/2007 | Hirakawa et al. | |

(Continued)

FOREIGN PATENT DOCUMENTS

EP 1154356 11/2001
WO WO 00 45581 A3 8/2000

OTHER PUBLICATIONS

Microsoft Computer Dictionary, 2002 Press Fifth Edition, p. 58.

(Continued)

*Primary Examiner* — Md. I Uddin
(74) *Attorney, Agent, or Firm* — Daly, Crowley, Mofford & Durkee, LLP

(57) ABSTRACT

In one aspect, a method includes generating a write signature command. The write signature command is configured to write a signature to an offset in a storage array without data and to enable the storage array to write the data with the same signature to a volume if the data is available at the storage array.

17 Claims, 18 Drawing Sheets

(56) References Cited

U.S. PATENT DOCUMENTS

| | | | |
|---|---|---|---|
| 7,167,963 B2 | 1/2007 | Hirakawa et al. | |
| 7,222,136 B1 | 5/2007 | Brown et al. | |
| 7,296,008 B2 | 11/2007 | Passerini et al. | |
| 7,328,373 B2 | 2/2008 | Kawamura et al. | |
| 7,360,113 B2 | 4/2008 | Anderson et al. | |
| 7,426,618 B2 | 9/2008 | Vu et al. | |
| 7,516,287 B2 | 4/2009 | Ahal et al. | |
| 7,519,625 B2 | 4/2009 | Honami et al. | |
| 7,519,628 B1 | 4/2009 | Leverett | |
| 7,546,485 B2 | 6/2009 | Cochran et al. | |
| 7,577,867 B2 | 8/2009 | Lewin et al. | |
| 7,606,940 B2 | 10/2009 | Yamagami | |
| 7,627,612 B2 | 12/2009 | Ahal et al. | |
| 7,627,687 B2 | 12/2009 | Ahal et al. | |
| 7,757,057 B2 | 7/2010 | Sangapu et al. | |
| 7,769,722 B1* | 8/2010 | Bergant et al. | 707/681 |
| 7,774,565 B2 | 8/2010 | Lewin et al. | |
| 7,930,499 B2* | 4/2011 | Duchesne | 711/162 |
| 8,074,014 B2* | 12/2011 | Narayanan et al. | 711/112 |
| 2002/0129168 A1 | 9/2002 | Kanai et al. | |
| 2003/0061537 A1 | 3/2003 | Cha et al. | |
| 2003/0110278 A1 | 6/2003 | Anderson | |
| 2003/0196147 A1 | 10/2003 | Hirata et al. | |
| 2004/0205092 A1 | 10/2004 | Longo et al. | |
| 2004/0250032 A1 | 12/2004 | Ji et al. | |
| 2004/0254964 A1 | 12/2004 | Kodama et al. | |
| 2005/0015663 A1 | 1/2005 | Armangau et al. | |
| 2005/0028022 A1 | 2/2005 | Amano | |
| 2005/0049924 A1 | 3/2005 | DeBettencourt et al. | |
| 2005/0172092 A1 | 8/2005 | Lam et al. | |
| 2005/0177603 A1* | 8/2005 | Shavit | 707/204 |
| 2005/0273655 A1 | 12/2005 | Chow et al. | |
| 2006/0031647 A1 | 2/2006 | Hirakawa et al. | |
| 2006/0047926 A1* | 3/2006 | Zheng | 711/162 |
| 2006/0047996 A1 | 3/2006 | Anderson et al. | |
| 2006/0064416 A1 | 3/2006 | Sim-Tang | |
| 2006/0107007 A1 | 5/2006 | Hirakawa et al. | |
| 2006/0117211 A1 | 6/2006 | Matsunami et al. | |
| 2006/0161810 A1 | 7/2006 | Bao | |
| 2006/0195670 A1 | 8/2006 | Iwamura et al. | |
| 2006/0212462 A1 | 9/2006 | Heller et al. | |
| 2006/0248373 A1* | 11/2006 | Warman et al. | 714/4 |
| 2007/0022144 A1* | 1/2007 | Chen | 707/204 |
| 2007/0055833 A1 | 3/2007 | Vu et al. | |
| 2007/0055835 A1* | 3/2007 | Malkin et al. | 711/162 |
| 2007/0180304 A1 | 8/2007 | Kano | |
| 2007/0198602 A1 | 8/2007 | Ngo et al. | |
| 2007/0198791 A1 | 8/2007 | Iwamura et al. | |
| 2007/0220311 A1* | 9/2007 | Lewin et al. | 714/6 |
| 2007/0266053 A1 | 11/2007 | Ahal et al. | |
| 2008/0010411 A1* | 1/2008 | Yang et al. | 711/122 |
| 2008/0082592 A1 | 4/2008 | Ahal et al. | |
| 2010/0293142 A1* | 11/2010 | Ackerman et al. | 707/640 |
| 2011/0040728 A1* | 2/2011 | Akirav et al. | 707/634 |
| 2011/0145260 A1* | 6/2011 | Ichino | 707/747 |

OTHER PUBLICATIONS

Soules et al.; "Metadata Efficiency in a Comprehensive Versioning File System", May 2002, CMU-CS-02-145, School of Computer Science, Carnegie Mellon University, Pittsburgh, PA 15213, 33 pages.

Office Action dated Dec. 21, 2011, U.S. Appl. No. 12/045,946, 14 pages.

Office Action dated Jan. 23, 2012, U.S. Appl. No. 12/818,236, 17 Pages.

Gibson, Five Point Plan Lies at the Heart of Compression Technology, Apr. 29, 1991, p. 1.

Soules, Metadata Efficiency in Versioning File Systems, 2003, pp. 1-16.

AIX System Management Concepts: Operating Systems and Devices May 2000, pp. 1-280.

File downloaded for U.S. Appl. No. 11/609,560, filed Dec. 26, 2007, U.S. Patent No. 7,774,565 Issued on Aug. 10, 2010, file through Mar. 1, 2012, 265 pages.

File downloaded for U.S. Appl. No. 12/057,652, filed Mar. 28, 2008, file downloaded Mar. 1, 2012, 296 pages.

File downloaded for U.S. Appl. No. 11/609,561, filed Dec. 12, 2006, U.S. Patent No. 7,849,361 Issued Dec. 7, 2010, file downloaded Mar. 1, 2012, 214 pages.

File downloaded for U.S. Appl. No. 11/356,920, filed Feb. 17, 2006, U.S. Patent No. 7,577,867 Issued on Aug. 18, 2009, file through Mar. 1, 2012, 240 pages.

File downloaded for U.S. Appl. No. 10/512,687, filed Aug. 24, 2005, filed through Mar. 1, 2012, 525 pages.

File downloaded for U.S. Appl. No. 11/536,215, filed Sep. 28, 2006, U.S. Patent No. 7,516,287 Issued on Apr. 7, 2009, file through Mar. 1, 2012, 167 pages.

File downloaded for U.S. Appl. No. 11/536,233, filed Sep. 28, 2006, U.S. Patent No. 7,627,612 Issued on Dec. 1, 2009, file through Mar. 1, 2012, 256 pages.

File downloaded for U.S. Appl. No. 11/536,160, filed Sep. 28, 2006, U.S. Patent No. 7,627,687 Issued on Dec. 1, 2009, file through Mar. 1, 2012, 230 pages.

File downloaded for U.S. Appl. No. 11/964,168, filed Dec. 26, 2007, U.S. Patent No. 7,797,357 Issued Sep. 14, 2010, file through Mar. 1, 2012, 222 pages.

* cited by examiner

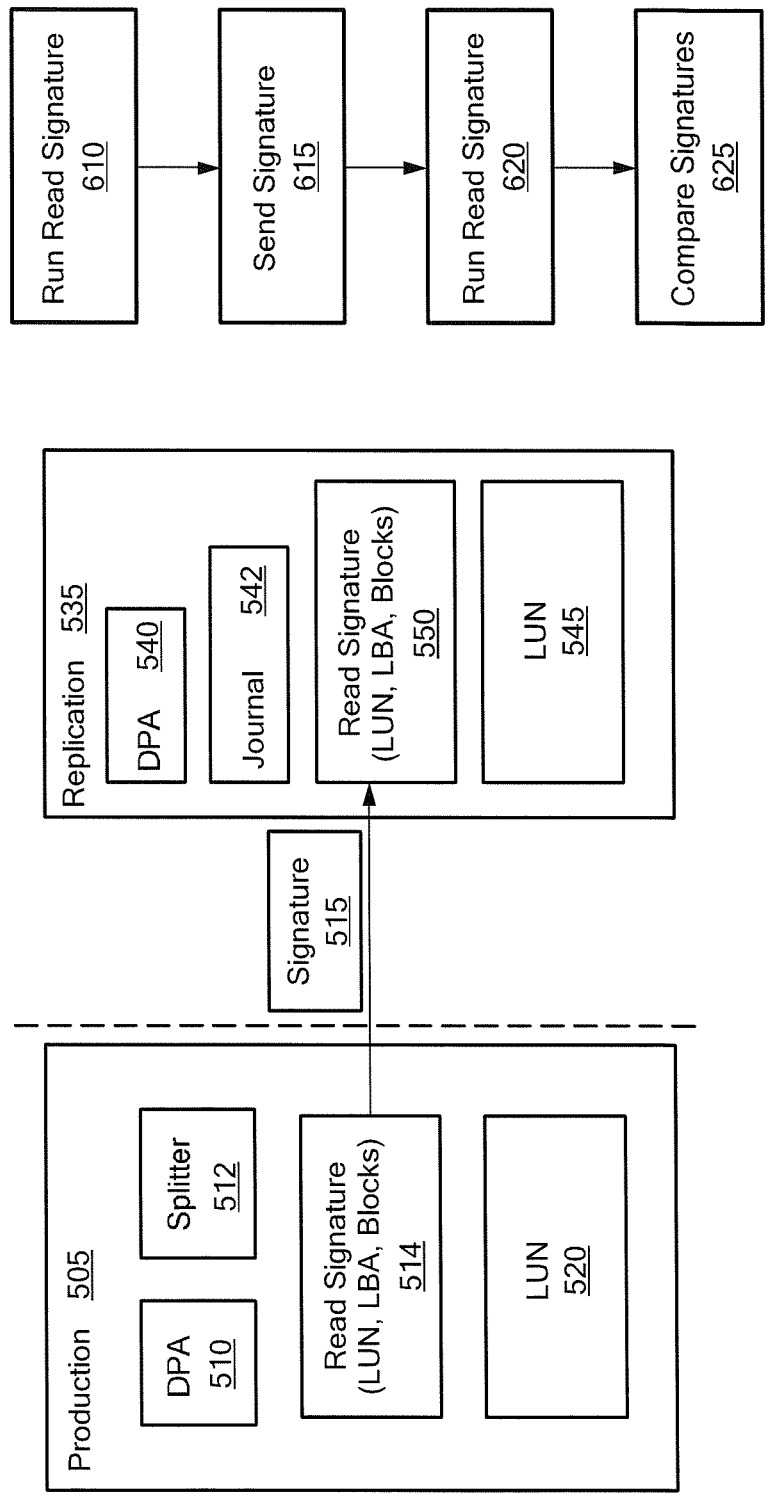

WRITE SIGNATURE COMMAND

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In one aspect, a method includes generating a write signature command. The write signature command is configured to write a signature to an offset in a storage array without data and to enable the storage array to write the data with the same signature to a volume if the data is available at the storage array.

In another aspect, an article includes a non-transitory machine-readable medium that stores executable instructions. The instructions cause a machine to generate a write signature command. The write signature command is configured to write a signature to an offset in a storage array without data and to enable the storage array to write the data with the same signature to a volume if the data is available at the storage array.

In a further aspect, an apparatus includes circuitry to generate a write signature command. The write signature command configured to write a signature to an offset in a storage array without data and to enable the storage array to write the data with the same signature to a volume if the data is available at the storage array.

BRIEF DESCRIPTION OF THE DRAWINGS

FIG. 4 is a block diagram of an example of a production site executing a read signature command and sending the signature to a replication site.

FIG. 5 is a flowchart of an example of a process to use read signatures.

DETAILED DESCRIPTION

Figure 1:
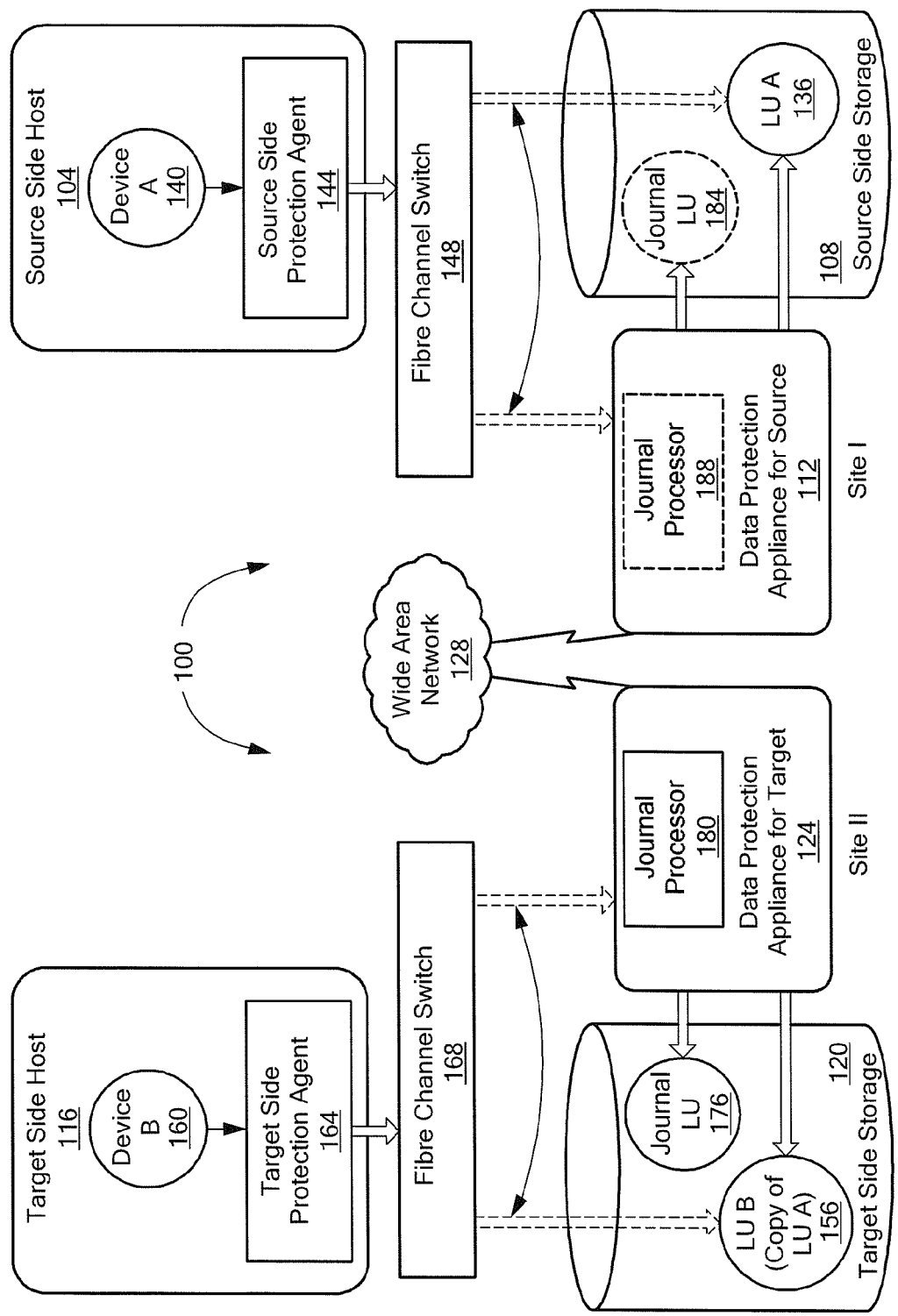
FIG. 1 is a block diagram of an example of a data protection system.

In one example, a write signature command may be added to a storage device. In certain examples, the write signature command may have a LUN, Logical Block Address (LBA), and number of blocks as parameters and may return a status (e.g., success, mismatched signature, or a temporary failure). In some examples, using the signatures may enable full silvering to be performed about 500 times faster than traditional silvering, since there is almost no data transfer. In still further examples, a periodic consistency and verification check may be run on volumes and their replicas.

The following definitions are employed throughout the specification and claims.

BACKUP SITE—may be a facility where replicated production site data is stored; the backup site may be located in a remote site or at the same location as the production site.

CLONE—a clone may be a copy or clone of the image or images, drive or drives of a first location at a second location.

DELTA MARKING STREAM—may mean the tracking of the delta between the production and replication site, which may contain the metadata of changed locations, the delta marking stream may be kept persistently on the journal at the production site of the replication, based on the delta marking data the DPA knows which locations are different between the production and the replication and transfers them to the replication to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system.

RPA—may be replication protection appliance, is another name for DPA.

HOST—may be at least one computer or networks of computers that runs at least one data processing application that issues I/O requests to one or more storage systems; a host is an initiator with a SAN.

HOST DEVICE—may be an internal interface in a host, to a logical storage unit.

IMAGE—may be a copy of a logical storage unit at a specific point in time.

INITIATOR—may be a node in a SAN that issues I/O requests.

JOURNAL—may be a record of write transactions issued to a storage system; used to maintain a duplicate storage system, and to rollback the duplicate storage system to a previous point in time.

LOGICAL UNIT—may be a logical entity provided by a storage system for accessing data from the storage system.

LUN—may be a logical unit number for identifying a logical unit.

PHYSICAL STORAGE UNIT—may be a physical entity, such as a disk or an array of disks, for storing data in storage locations that can be accessed by address.

PRODUCTION SITE—may be a facility where one or more host computers run data processing applications that write data to a storage system and read data from the storage system.

SAN—may be a storage area network of nodes that send and receive I/O and other requests, each node in the network being an initiator or a target, or both an initiator and a target.

SOURCE SIDE—may be a transmitter of data within a data replication workflow, during normal operation a production site is the source side; and during data recovery a backup site is the source side.

SNAPSHOT—a Snapshot may refer to differential representations of an image, i.e., the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators.

TARGET—may be a node in a SAN that replies to I/O requests.

TARGET SIDE—may be a receiver of data within a data replication workflow; during normal operation a back site is the target side, and during data recovery a production site is the target side.

WAN—may be a wide area network that connects local networks and enables them to communicate with one another, such as the Internet.

SPLITTER/PROTECTION AGENT—may be an agent running either on a production host a switch or a storage array which can intercept IO and split them to a DPA and to the storage array, fail IO redirect IO or do any other manipulation to the IO.

VIRTUAL VOLUME—may be a volume which is exposed to host by a virtualization layer, the virtual volume may be spanned across more than one site.

DISTRIBUTED MIRROR—may be a mirror of a volume across distance, either metro or geo, which is accessible at all sites.

BLOCK VIRTUALIZATION—may be a layer, which takes backend storage volumes and by slicing concatenation and striping create a new set of volumes, which serve as base volumes or devices in the virtualization layer.

MARKING ON SPLITTER—may be a mode in a splitter where intercepted IOs are not split to an appliance and the storage, but changes (metadata) are tracked in a list and/or a bitmap and I/O is immediately sent to down the IO stack.

FAIL ALL MODE—may be a mode of a volume in the splitter where all write and read IOs intercepted by the splitter are failed to the host, but other SCSI commands like read capacity are served.

GLOBAL FAIL ALL MODE—may be a mode of a volume in the virtual layer where all write and read IOs virtual layer are failed to the host, but other SCSI commands like read capacity are served.

LOGGED ACCESS—may be an access method provided by the appliance and the splitter, in which the appliance rolls the volumes of the consistency group to the point in time the user requested and let the host access the volumes in a copy on first write base.

VIRTUAL ACCESS—may be an access method provided by the appliance and the splitter, in which the appliance exposes a virtual volume from a specific point in time to the host, the data for the virtual volume is partially stored on the remote copy and partially stored on the journal.

CDP—Continuous Data Protection, may refer to a full replication of a volume or a set of volumes along with a journal which allows any point in time access, the CDP copy is at the same site, and maybe the same storage array of the production site.

CRR—Continuous Remote Replication may refer to a full replication of a volume or a set of volumes along with a journal which allows any point in time access at a site remote to the production volume and on a separate storage array.

As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Five State Journaling

Reference is now made to FIG. 1, which is a simplified illustration of a data protection system 100. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with examples described herein.

In one example, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In one example, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In one example, storage system 108 exposes a logical unit 136, designated as LU A, and storage system 120 exposes a logical unit 156, designated as LU B.

In one example, LU B is used for replicating LU A. As such, LU B is generated as a copy of LU A. In one example, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in some examples, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In one example, host device 104 identifies LU A and generates a corresponding host device 140, designated as Device A, through which it can access LU A. Similarly, host computer 116 identifies LU B and generates a corresponding device 160, designated as Device B.

In one example, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In one example, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In one example, host computer 104 and host computer 116 include protection agents 144 and 164, respectively. Protection agents 144 and 164 intercept SCSI commands issued by their respective host computers, via host devices to logical units that are accessible to the host computers. In one example, a protection agent (also called herein a splitter) may act on an intercepted SCSI commands issued to a logical unit, in one of the following ways: Send the SCSI commands to its intended logical unit; Redirect the SCSI command to another logical unit; Split the SCSI command by sending it first to the respective DPA; After the DPA returns an acknowledgement, send the SCSI command to its intended logical unit; Fail a SCSI command by returning an error return code; and Delay a SCSI command by not returning an acknowledgement to the respective host computer.

The protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. The protection agent may also change its behavior for handling SCSI commands, for example as a result of an instruction received from the DPA.

Specifically, the behavior of the protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In one example, protection agents communicate with their respective DPAs by sending SCSI commands over fiber channel.

In one example, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In one example, in a production mode DPA 112 acts as a source site DPA for LU A. Thus, the protection agent 144 is configured to act as a source side protection agent; i.e., as a splitter for host device A. Specifically, the protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from a protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in one example, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In one example, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A to 3D, journal entries include four streams, two of which are written when write transaction are entered into the journal, and two of which are written when write transaction are applied and removed from the journal.

Figure 2:
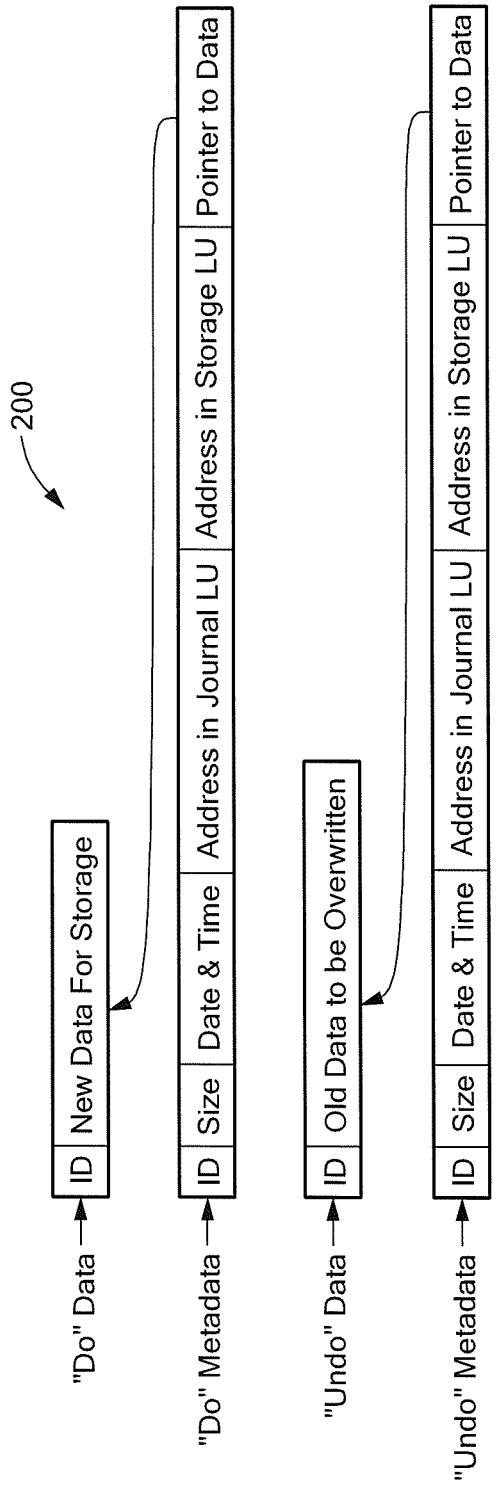
FIG. 2 is a block diagram of an example of a write transaction for a journal.

Reference is now made to FIG. 2, which is a simplified illustration of a write transaction 200 for a journal, in one example. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more examples is provided. A replication may set refer to an association created between the source volume and the local and/or remote target volumes, and a consistency group may contain one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH®), through an intelligent fabric switch, through array-based splitter, such as EMC CLARIION®.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replication is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an example of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some examples in physical logged access, the system may roll backward (or forward) to the selected snapshot (point in time). There may be a delay while the successive snapshots are applied to the replication image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Distribution to storage may continue from the accessed snapshot forward.

Disable image access may mean changes to the replication may be discarded or thrown away. It may not matter what type of access was initiated, that is, logged or another type, or whether the image chosen was the latest or an image back in time. Disable image access effectively says the work done at the disaster recovery site may no longer be needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g., DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replication site to the replica.

Read Signature Command

In one example, the current disclosure may enable read signatures for a storage device. A read signature may take a set of parameters and return a signature or hash value for those set of parameters. In some examples, the set of parameters may include a range. In certain examples the read signature may include a LUN. In at least some examples, the read signature command may include an LBA (Logical Block Address). In further examples, the read signature may have different ranges of data. In some examples, the read signature may return a hash value for the specified set of parameters. In most examples, comparing to signatures of a set of data may provide a way to determine if two sets of data are equivalent. In certain examples, the read signature may be implemented as a SCSI command.

In some examples, the signature may be calculated and stored with the data. In alternative examples, multiple signatures may be stored for data, each signature representing a different granularity of the data (i.e., there may be a signature for every 16 kb chunk as well as a signature for the megabyte chunk). In certain examples, when a write IO arrives, it may invalidate a stored signature for the location of the write IO. In other examples, a background process may update signatures that are out of date.

In one example, the read signature command may be used in initialization of a storage system. In some examples, read signature commands may be performed on the data of the production site. In certain examples, the read signatures may be sent to the replication site. In further examples, the replication site may perform read signature commands. In at least some examples, the signatures of the replication site and production site may be compared to determine if the data is equivalent on the production and replication sites.

In alternative examples, the read signature may be performed on data of different block sizes. In some examples, the read signatures may be of size 8 kB. In other examples, the read signature size may be 16 kB. In further examples, the read signature size may be 1 megabyte. In still further examples, the read signature command may contain offsets and lengths of the data. In still further examples, the read signature commands may be used to verify data during a disaster recovery. In some examples, a read signature for a large data block may be used when the majority of the data is the same. In other examples, when the data signatures of large data blocks on the replication and production site are found to not be the same, smaller read signatures may be used to determine what portion of the data is out of sync.

In further examples, IO may be occurring contemporaneously with the comparison of the read signatures. In certain examples, when two signatures are compared and are not equal, further steps may be taken to determine if IO occurred to make the read signatures not be equivalent. In some examples, the signature may be used for verifying replication integrity. In another example, the signature may be used for verification and initialization. In other examples, either the production or replication site may not support the read signature command. In the examples where one site does not support the command, the data may be read and the signature may be calculated.

Figure 3:
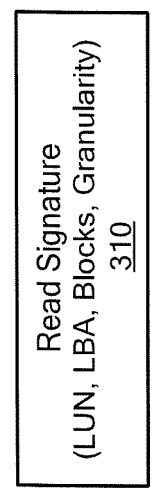
FIG. 3 is an example of a read signature command.

Referring to FIG. 3, a read signature command 310 may be executed. In this example, the read signature command 310 includes a LUN, an LBA, and a block range, and signature granularity (i.e., a request may be made for 1 MB of data in granularity of a signature for each 8 kB which would return 128 signatures).

In some examples, the signature command may be used to accelerate the aforementioned initialization process. In certain examples, the initialization process may read all the locations which are marked as dirty in the delta marker stream and transfers the data to the replication site. In most examples, before transferring the data, the initialization process may check if the replication site already has the relevant data, if the data already exist at the replication site may not send the data. In certain examples, the first time the system initialized, all the locations may be marked as dirty in the delta marker stream. In some examples, the read signatures command may allow the data at the production and replication site to be checked to determine if the data is identical without actually reading the data.

Referring to FIGS. 4 and 5, a production site 505 may have LUN 520. LUN 520 may have one or more sets of blocks. Read Signature command 514 may be run (610). Signature 515 may be sent to replication site 535 (615). Read Signature command 550 may be run (620) at replication site 535. Signature 515 and the resulting signature from read signature 550 may be compared (625).

Figure 6:
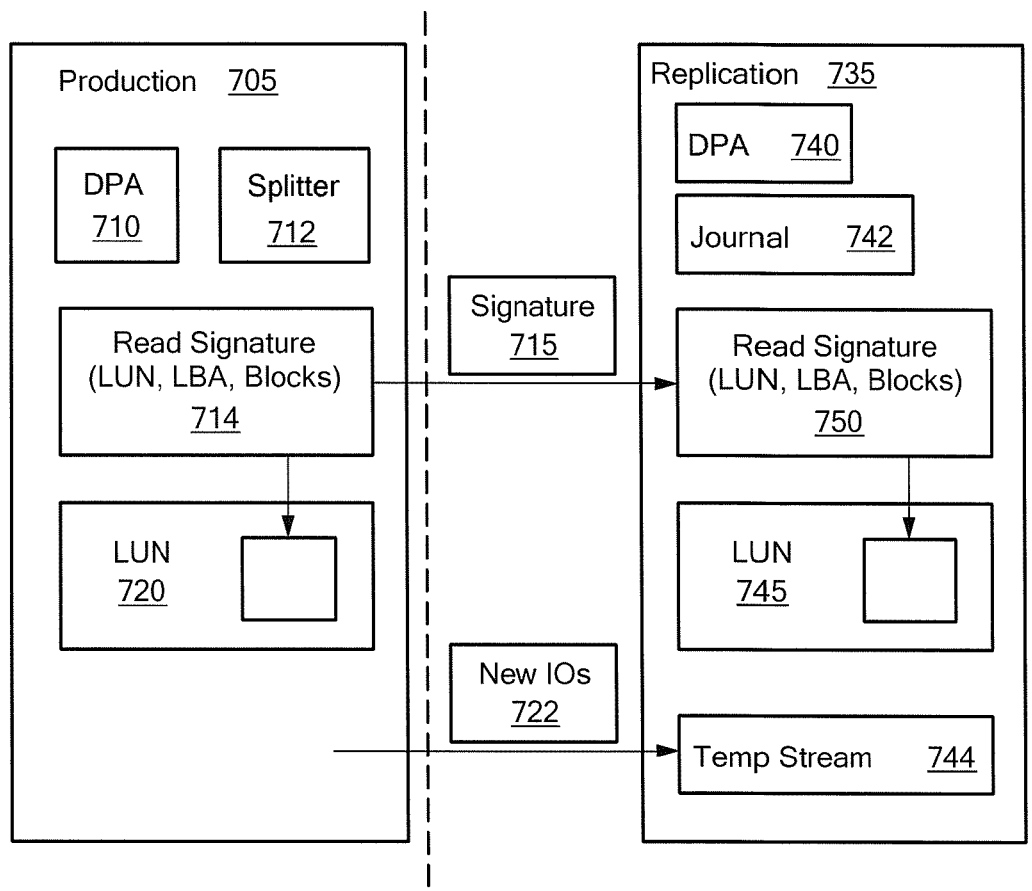
FIG. 6 is a block diagram of an example of an alternative example of a production site executing a read signature command and sending the signature to a replication site.
Figure 7:
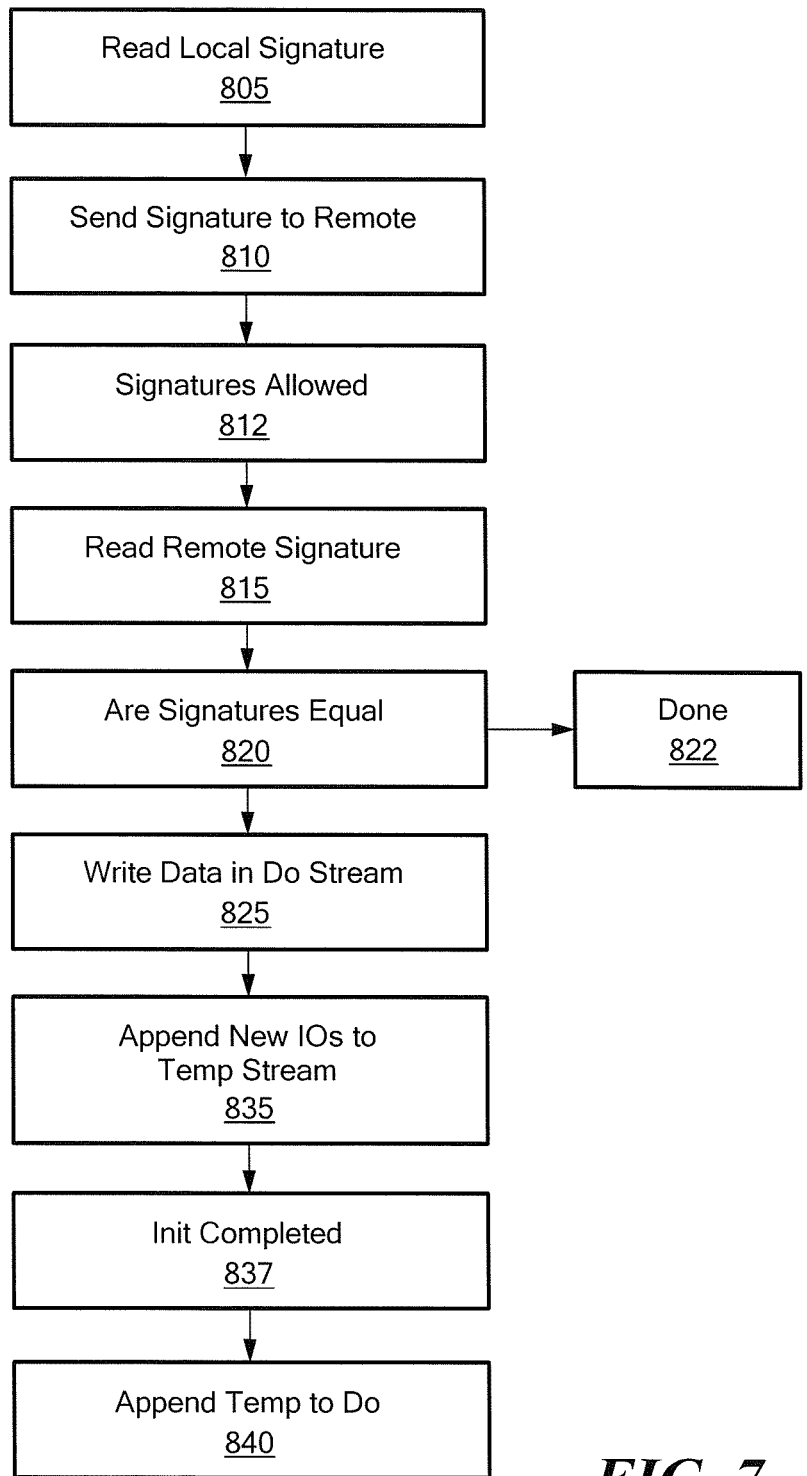
FIG. 7 is a flowchart of another example of a process to use read signatures.

Referring to FIGS. 6 and 7, a read signature command 714 for LUN 720 of Production site 705 may be executed (805). Read signature 715 may be sent to the remote site 735 (815). The remote site may check if reading signature for the specific location is allowed (812). In certain examples there may be locations in the do stream which contain data from sessions before the current initialization, which have not yet been applied to the replication volumes. In these examples, for such locations, it may not be possible to use remote signature directly from the replication journal.

If signatures are allowed at the replication site for the specific location, a read signature command 750 for the data may be executed on the remote site 735 (815). The signatures may be compared (820). If the signatures are equivalent, the data is verified (822).

If the signatures are not equivalent, data may be read from the production site 805 and sent to do stream in journal 742 on the replication site 735 (825). Open IOs may be flushed. In some examples, the process of verifying the locations suspected as different between the production and replication may occur while new IOs arrive to the production LU. New, incoming, IOs 722 may be written to temporary stream 744 (835). After the initialization, process is complete, the IOs in temporary stream 744 may be added to the DO stream in journal 742 (840).

Figure 8:
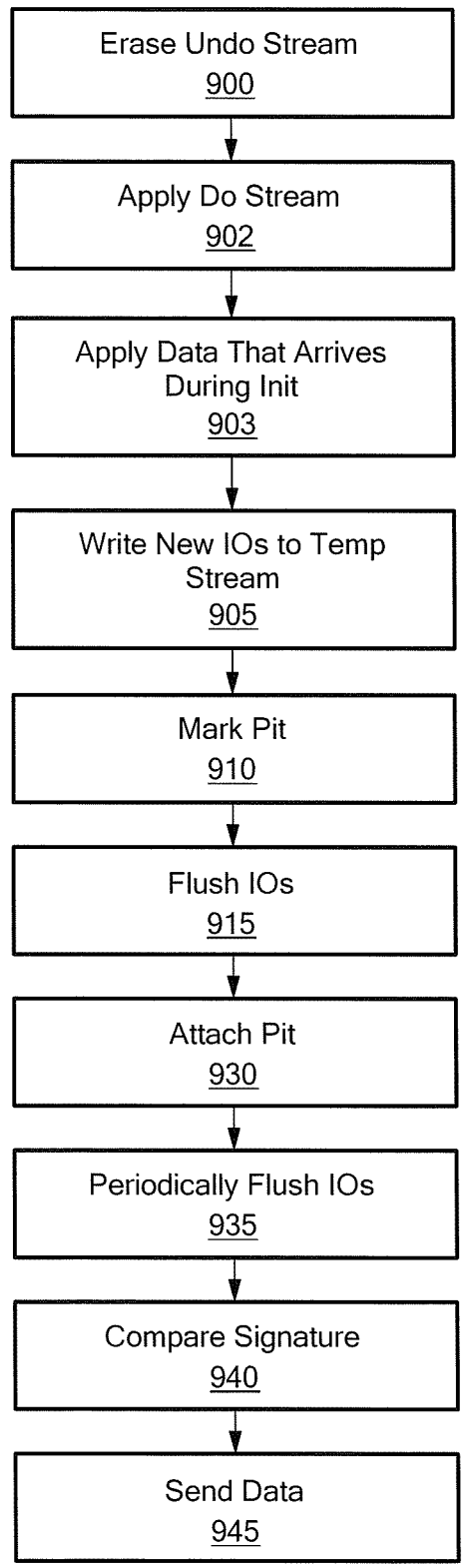
FIG. 8 is a flowchart of a further example of a process to use read signatures.
Figure 9:
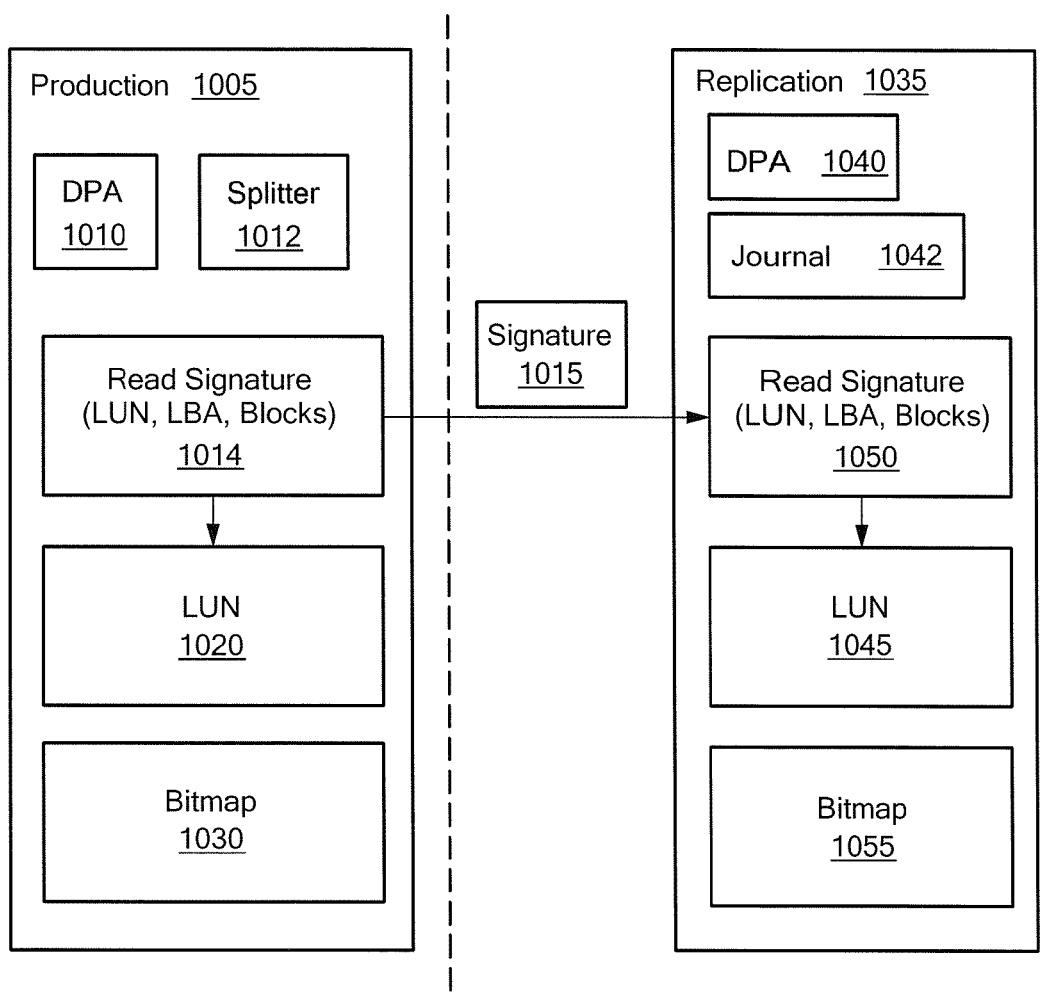
FIG. 9 is a block diagram of another example of a production site with a bitmap to execute a read signature command and to send the signature to a replication site with a bitmap.

Referring to FIGS. 6 and 8, there may not be enough space in the DO and UNDO streams of journal 742 to perform the initialization. In FIGS. 7 and 9, system moves to a special mode of initialization, where there may not be a consistent point in time available. The UNDO stream is erased (900). Data from the do stream is applied to the replication volumes (902). Once all data from previous sessions in do stream is applied to the remote storage, (i.e., all data that was not written to the do stream in the current initialization process), the system may start applying the data arriving from the initialization process directly to the remote replication (903). IOs containing new data arrive to temporary stream (905). Periodically, the splitter marks a point in time (910). The splitter flushes all open IOs (915). All IOs associated with the flush, i.e., IOs which completed before the flush time, may be marked with the point-in-time (PIT) (930). The system applies new IOs from the temporary stream, which arrived before the flush point to the replication volume, allowing the system to transfer the data from the temporary stream to the replication volume while initialization process still running.

During the initialization process the system reads the signature (940) for every location suspected as dirty, if the system is allowed to read signature at the replication site (i.e., either all do stream data applied to the journal or the location is not marked in the do stream), the system reads the signature of the data at the replication site, and only if the signature read is not allowed or signatures are not identical the production site sends the initialization data to the replication site (945).

In other examples, the read signatures command may enable a replication system to perform a consistency check of the replication while IOs continue to arrive from the production volume.

Figure 10:
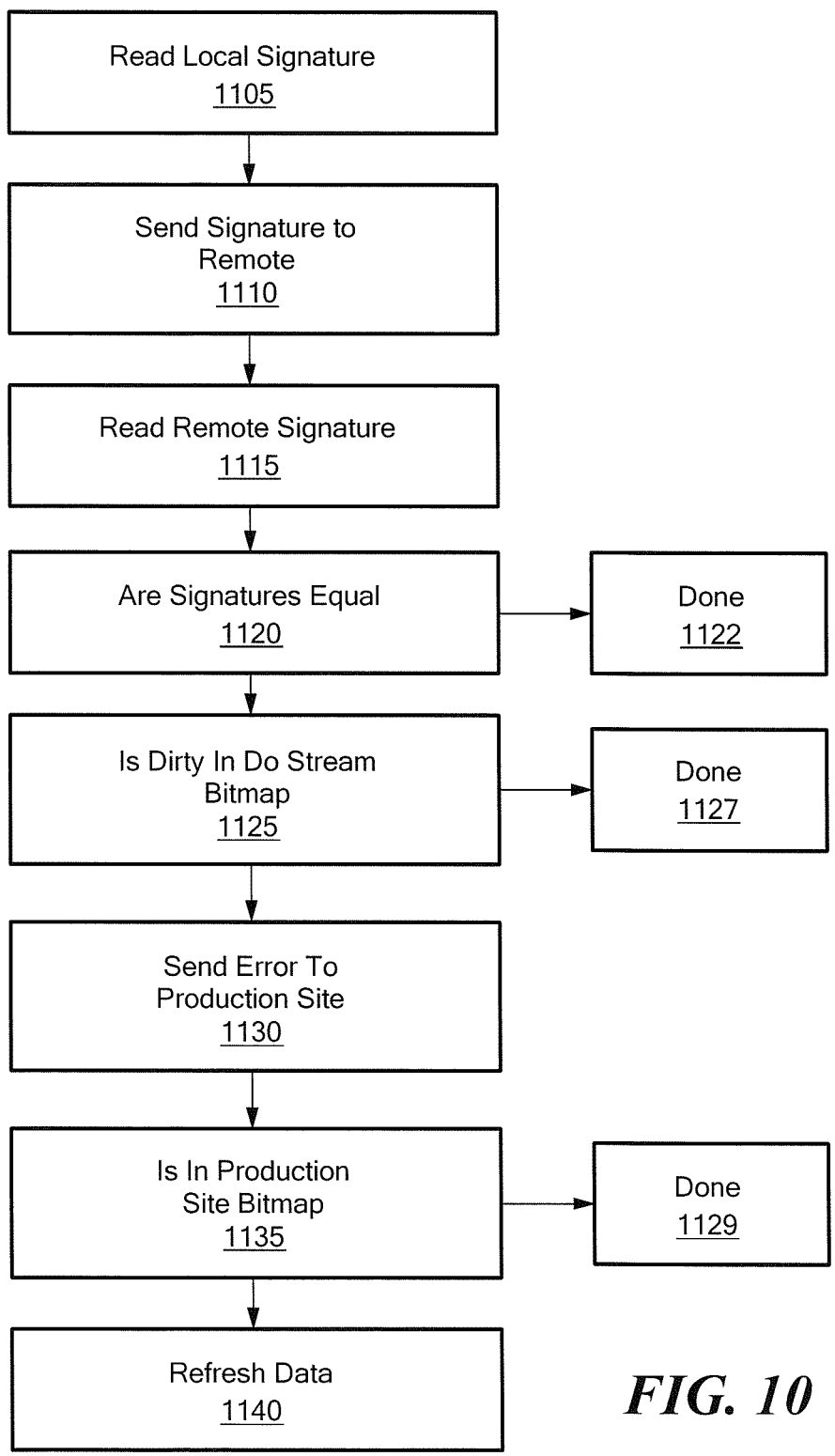
FIG. 10 is a flowchart of an example of a process to use read signatures with bitmaps.

Referring to FIGS. 9 and 10, an integrity check is being performed and there is dirty bitmap 1030 on production site 1005 and a dirty bitmap 1055 on replication site 1035. The bitmaps, 1030 and 1055, track changes that have occurred but may not have been entered on replication LUN 1045. For example, if IO is in the DO stream of journal 1042, but has not been written to LUN 1045, then the replication bitmap 1055 may track this change. If the data has been changed on production site 1005 but has not been sent to or entered on replication site 1035, then production bitmap 1030 may track this change. In certain examples, to perform a full integrity check of a replicated volume, the system may try to compare the data of the volume between the two sites.

A read signature 1014 is performed on the production site 1005 (1105). Signature 1015 from read signature 1014 is sent to the remote or replication site 1035 (1110). Read signature command 1050 is read at the remote or replication site 1035 (1115). A determination is made if the signatures are equal (1120). If the signatures are equal the process is complete and the system may move to checking the next set of blocks. (1122).

If the signatures are not equal, replication bitmap 1055 is examined to see if the location corresponding to the signatures is in the bitmap 1055 (1125). If it is in bitmap 1055, the process is done (1127). If it is not in bitmap 1055, an error is sent to the production site 1005 (1130). Production bitmap 1030 is examined to see if the location is in production bitmap 1030 (1135). If it is in production bitmap 1030, the process is done (1129). If it is not in production site bitmap 1030, the data may not be the same and may need to be refreshed (1140). If integrity check fails, integrity check may stop with an error, or system may automatically read suspected area from the disk and sent it to the replication site to fix the corruption.

In some examples, the read signature command may be executed in a coarse granularity such as requesting a signature for a 10 MB block. In certain examples, signatures for such a large block may be used to quickly compare production and replication data to ensure consistency. In other examples, if a signature comparison for a coarse block, such as 10 MB, is not equal then that block may be divided up into sub block such as 1 MB and the signature for these ten 1 MB sub blocks may be compared to determine what portion of the 10 MB is not equivalent. In further examples, this process may be repeated to identify the portions of the data which is not equivalent. In alternative examples, each of these signatures may be calculated and stored with the LUN data. In other alternative examples, this data may be recalculated on demand. In still further examples, a stored signature may be recalculated automatically when a write is sent to a particular area of the LUN.

Figure 11:
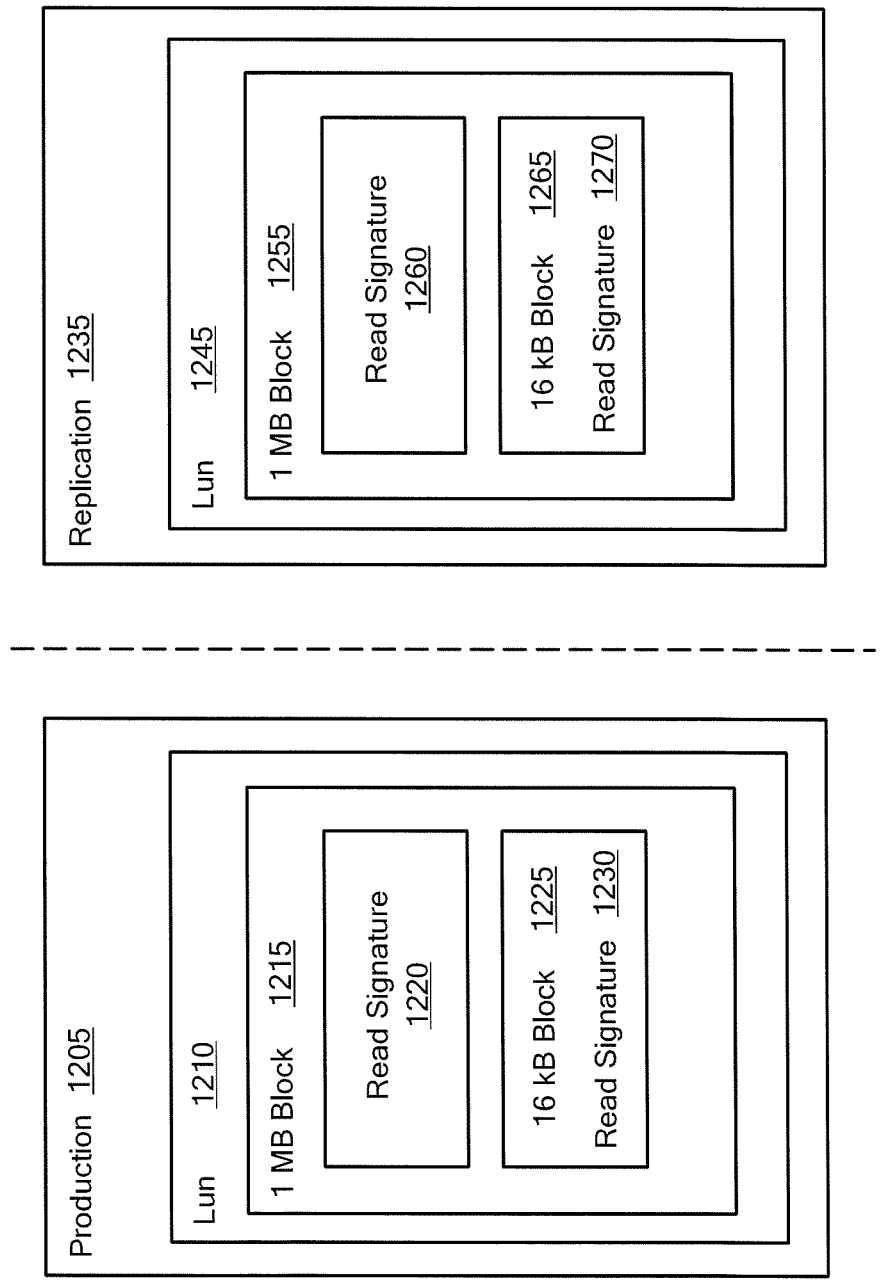
FIG. 11 is a block diagram of another example of a production site with multiple read signatures and a replication site with multiple read signatures.
Figure 12:
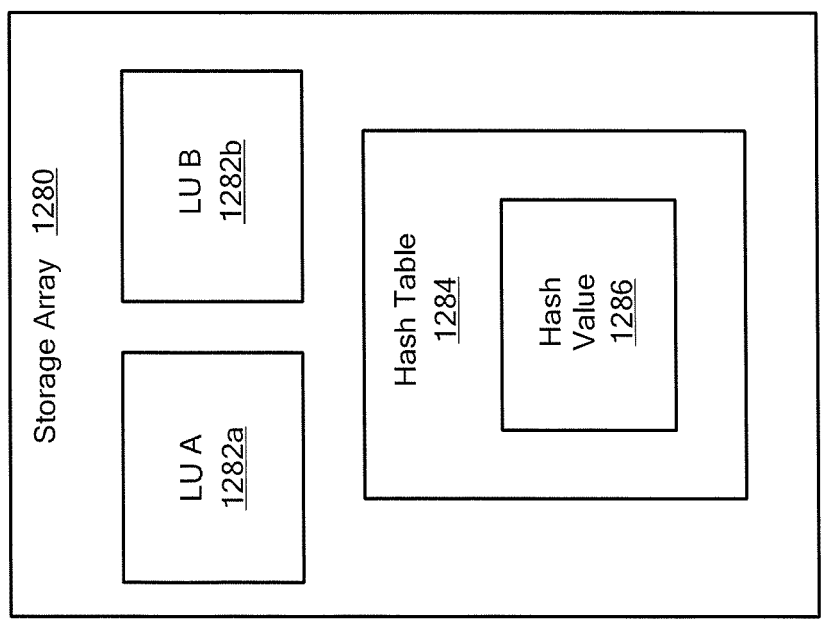
FIG. 12 is a block diagram of a storage array including a hash table.

FIG. 11 illustrates a production site 120 and a replication site 1235 with signatures of different sizes for different data sizes on LUN 1210. LUN 1210 has 1 megabyte (MB) block 1215. For block 1215 LUN 1210 has read signature 1220. LUN 1210 may also be partitioned to 16 kB blocks 1225 which are part of block 1215. Each 16 kB block 1225 may have signature 1230. LUN 1245 has 1 megabyte block 1255. For block 1255 LUN 1245 has read signature 1260. LUN 1245 may also be partitioned to 16 kB block 1265 which is part of block 1215. Each 16 kB block 1265 has read signature 1270. In FIG. 12, these signatures are stored on production 1205 and replication 1235 sites, the signatures may also be calculated on demand when the read signature command arrives. If a comparison is performed, read signatures 1220 and 1260 may be compared to determine if the blocks are equivalent. If the blocks are not equivalent, signatures 1230 and 1270 may be compared to determine if blocks 1225 and 1265 are equivalent.

Write Signature Command

In one example, the current disclosure may also enable write signatures for a storage device. A write signature command may include a set of parameters. For example, the write signature command may include one or more of the following parameters:

1. LBA (logical block address) for the target of the write
2. Number of blocks of the IO
3. Signature granularity
4. 16 or 32 byte of hash value (or signature), for each signature granularity block (e.g., if granularity is 16 blocks and 64 blocks are written, then there will be 4 signatures each of 16 or 32 bytes).

The write signature or the hash value is the same value that would have been returned if a read signature command was sent for the data the user wanted to write to the LBA. The write signature or hash value size (e.g., 16 byte or 32 byte or any other size) is large enough so that there is very high probability that if two sets of data have the same signature then the two sets of data are identical. The purpose of the write signature command is to save significant amounts of bandwidth when replicating data from one site to another site.

In one example, a write signature command (having parameters LUN A, offset B, 16 blocks, 16 blocks granularity, signature X) means that the storage array will search to determine if there is a data 16 blocks in size stored anywhere, with signature equal to X. If the answer is yes, the storage array will copy the data it found into LUN A offset B, and return a success status message. If the answer is negative, the storage array will return a signature mismatch status, or any other failure status.

In one example, the write signature command may be considered as a form of remote extended copy command (xcopy), i.e., to allow copying data from one storage array to another storage array, without real data movement (and without the arrays knowing of each other in this case).

Referring to FIG. 12, a storage array 1280 includes a LU A 1282a, a LU B 1282b and a hash table 1284. The storage array 1280 may implement the write signature commands as follows. In one example, the storage array 1280 may allow write signature commands only for constant block sizes, e.g., allow write signature only for 8 kB aligned blocks. The storage array 1280 may also implement the hash table 1284. In one example, the size of the hash table 1284 may be configurable and may be large enough to store a signature for each signature block element of the storage. In one particular example, if the storage is 8 TB and each signature represents 8 kB, 1,000,000,000 signatures would be stored each about 32 bytes in size (including the metadata of where the data is being stored). In this particular example, the hash table would only consume 32 GB of data.

The key to the hash table 1284 will be the signature or hash value 1286. The hash value 1286 in the hash table 1284 will be the offset, and logical unit, where data with the same signature is held.

The hash table 1284 may be stored on memory, on an EFD (enterprise flash drive), on a flash card, on standard drives and so forth. The hash table 1284 may be synchronously updated (i.e., with every new write the hash table 1284 will be updated). In this case if a signature is found in the hash table 1284 the data may be immediately copied from the location indicated in the hash table to the location the write signature command indicated. However, a more desired implementation would be to update the hash table 1284 asynchronously. If the hash table 1284 is not completely updated, when a user issues a write command, the signature is searched in the hash table 1284. If the signature is not found a signature mismatch message will returned. Otherwise, if the signature is found, the data in the location indicated by the hash table will be read and the signature for the data will be calculated. Only if the signatures match will the data be written to the location indicated by the write signature command and a success message will be returned. Otherwise a signature mismatch will occur.

In the case of the asynchronous update, a background process will rescan the location in the disk that changed and update the data in the hash table in a background process.

Figure 13A:
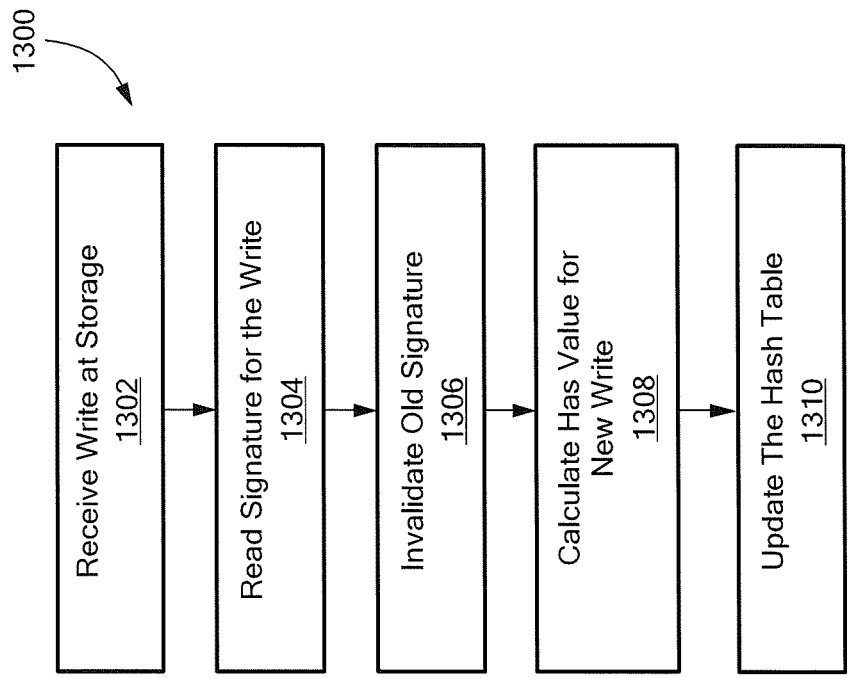
FIG. 13A is a flowchart of an example of a process to update signatures synchronously.

Referring to FIG. 13A, a process 1300 is an example of a process to update write signatures synchronously. Process 1300 receives a write at the storage array 1280 (1302) and reads a signature for the offset of the write (1304). Process 1300 invalidates the old signature (1306) (i.e., ensuring the old signature does not point to the offset indicated by the write) determines a hash value for the write (1308) and updates the hash table 1284 (1310).

Figure 13B:
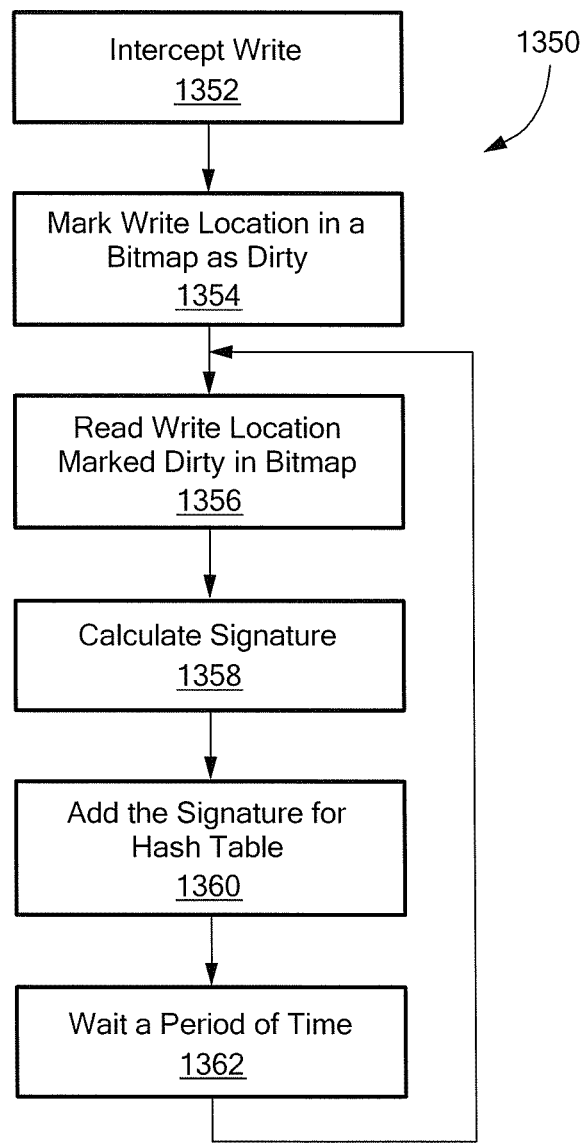
FIG. 13B is a flowchart of an example of a process to update signatures asynchronously.

Referring to FIG. 13B, a process 1350 is an example of a process to update write signatures asynchronously. Process 1350 marks a write location in a bitmap as dirty (1354) and reads the data from the location marked dirty in the bit map (1356). Process 1350 calculates a signature and adds the signature for the hash table 1284.

As used herein, in a hash table the key for a hash entry is the signature. A value for the key in the hash table is the signature and the offset and logical unit of where the data is stored.

Process 1350 waits a period of time and repeats processing blocks 1356, 1358, 1360 and 1362 by reading the data from location marked dirty (1356), calculating a signature (1358), adding the signature for the hash table (1360) and waiting a period of time (1362).

Figure 14A:
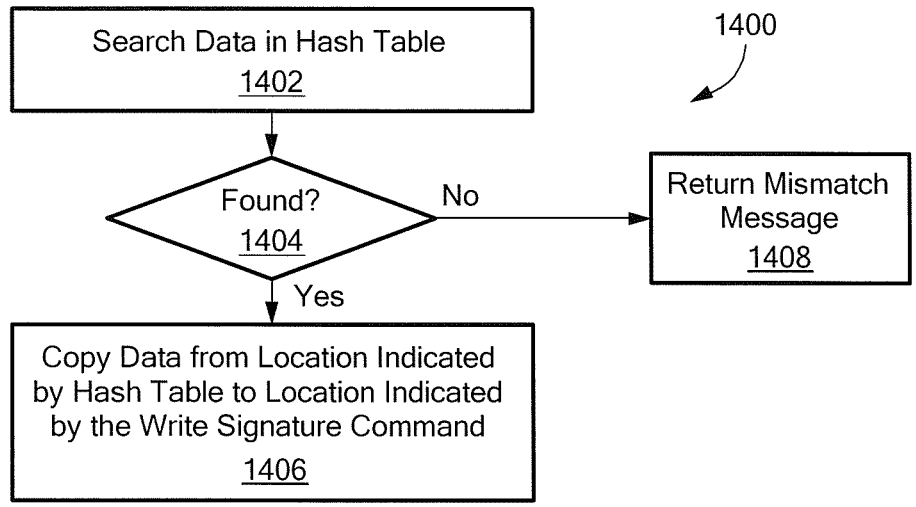
FIG. 14A is a flowchart of an example of a process to handle write signatures in a synchronous mode.

Referring to FIG. 14A, a process 1400 is an example of a process to handle write signatures synchronously. When a write signature command arrives at the storage array process 1400 searches for data in a hash table 1284 (1402) and determines whether the hash value is found (1404). If the hash value is found, process 1400 copies the data from the location indicated by the hash table 1284 to a location indicated by the write signature command (1406). If the hash value is not found, process 1400 returns a mismatch message.

Figure 14B:
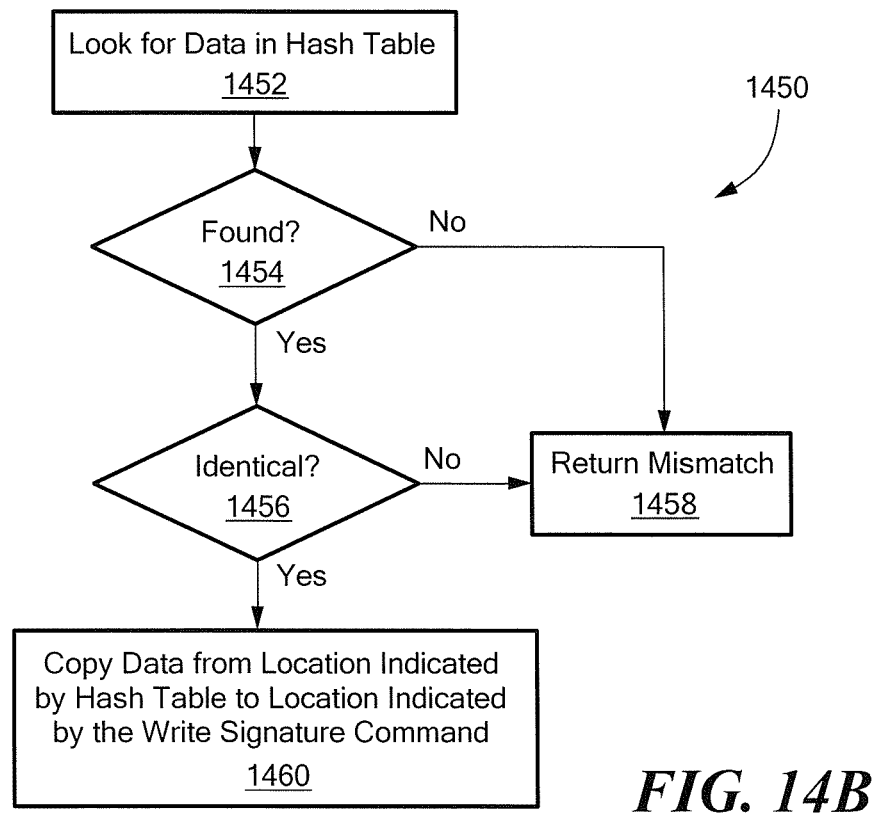
FIG. 14B is a flowchart of an example of a process to handle write signatures in an asynchronous mode.

Referring to FIG. 14B, a process 1450 is an example of a process to handle write signatures asynchronously. A write signature arrives at the storage array and process 1400 searches for hash value in a hash table 1284 (1402) and determines whether the hash value is found (1454). If the hash value is found, process 1400 determines whether the hash value is identical to the hash value of the data which is currently stored at the location indicated by the hash table (1456). If the hash value is identical, process 1450 copies the data from the location indicated by the hash table 1284 to a location indicated by the write signature command (1460). If the data is not found or is not identical, process 1450 returns a mismatch message. Because of the way write signatures are handled when signatures are updated asynchronously, there is no need to invalidate old signatures.

Figures 15, 16:
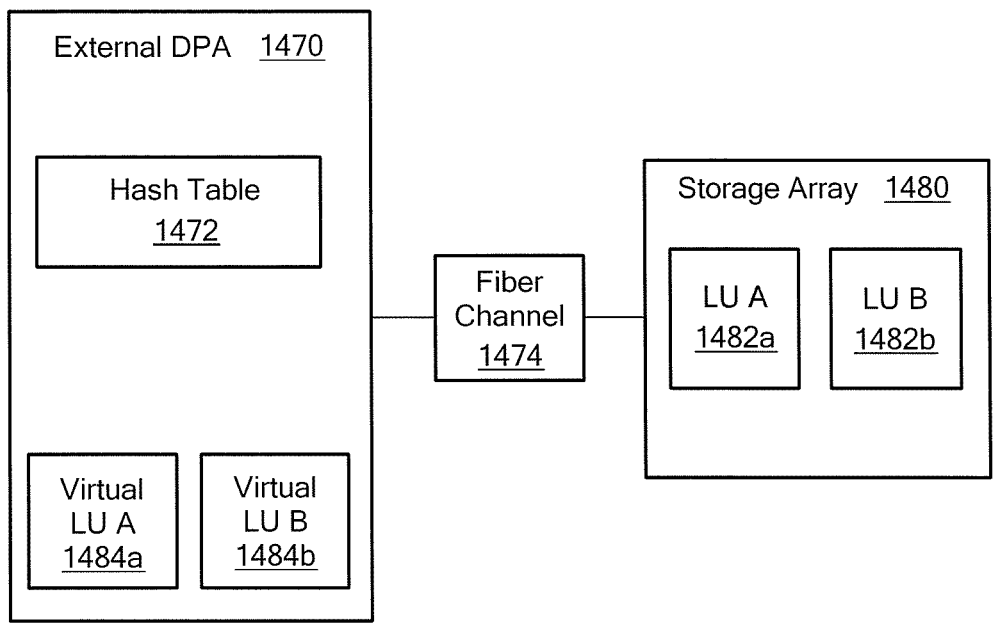
FIG. 15 is a block diagram of an external data protection appliance including a hash table.
FIG. 16 is an example of a write signature command.

Referring to FIG. 15, in some examples, the write signature command may be implemented by an external data protection appliance (DPA) and not by the storage array itself. For example, an external DPA 1470 includes a hash table 1472 and is coupled to a storage array 1480 by a fiber channel 1474. The storage array 1480 includes a LU A 1482a and a LU B 1482b. The external DPA 1470 may expose a virtual volume (e.g., a virtual LU A 1484a and a virtual LU B 1484b) for each volume in the storage array 1480. In some examples, the virtual device (e.g., the virtual LU A 1484a and the virtual LU B 1484b) will support write signature commands and if the signature is found, the external DPA 1470 will write the data to the location in the original storage array 1480. In some examples, the DPA 1470 may be a device serving write signature commands to the storage array 1480.

Referring to FIG. 16, a write signature command 1490 may be executed. In this example, the write signature command 1490 includes a LUN, an LBA (logical block address) and a block range, and signature granularity (i.e., a request may be made for 1 MB of data in granularity of a signature for each 8 kB which would include 128 signatures).

In some examples, the write signature command may be used to accelerate the aforementioned initialization process. In certain examples, the initialization process may read all the locations which are marked as dirty in the delta marker stream and transfer the data to the replication site. In most examples, before transferring the data, the initialization process may check if the replication site already has the relevant data stored somewhere on the replication storage. If the data already exists at the replication site, then the data may not be sent. In certain examples, the first time the system is initialized, all the locations may be marked as dirty in the delta marker stream. In some examples, the write signatures command may allow the data at the production and replication site to be checked to determine if the data is identical without actually reading the data at the production site and transferring the data to the replication site.

In one example, a fresh installation of an application (e.g., MICROSOFT® SHAREPOINT®) is installed on a new production LUN. A new replication LUN is defined. If the application already installed on any other replication LUN, a significant amount of data transferring time may be saved by copying data blocks from the replication installation of the application instead of the production one. Thus, the write signature saves bandwidth.

Figure 17A:
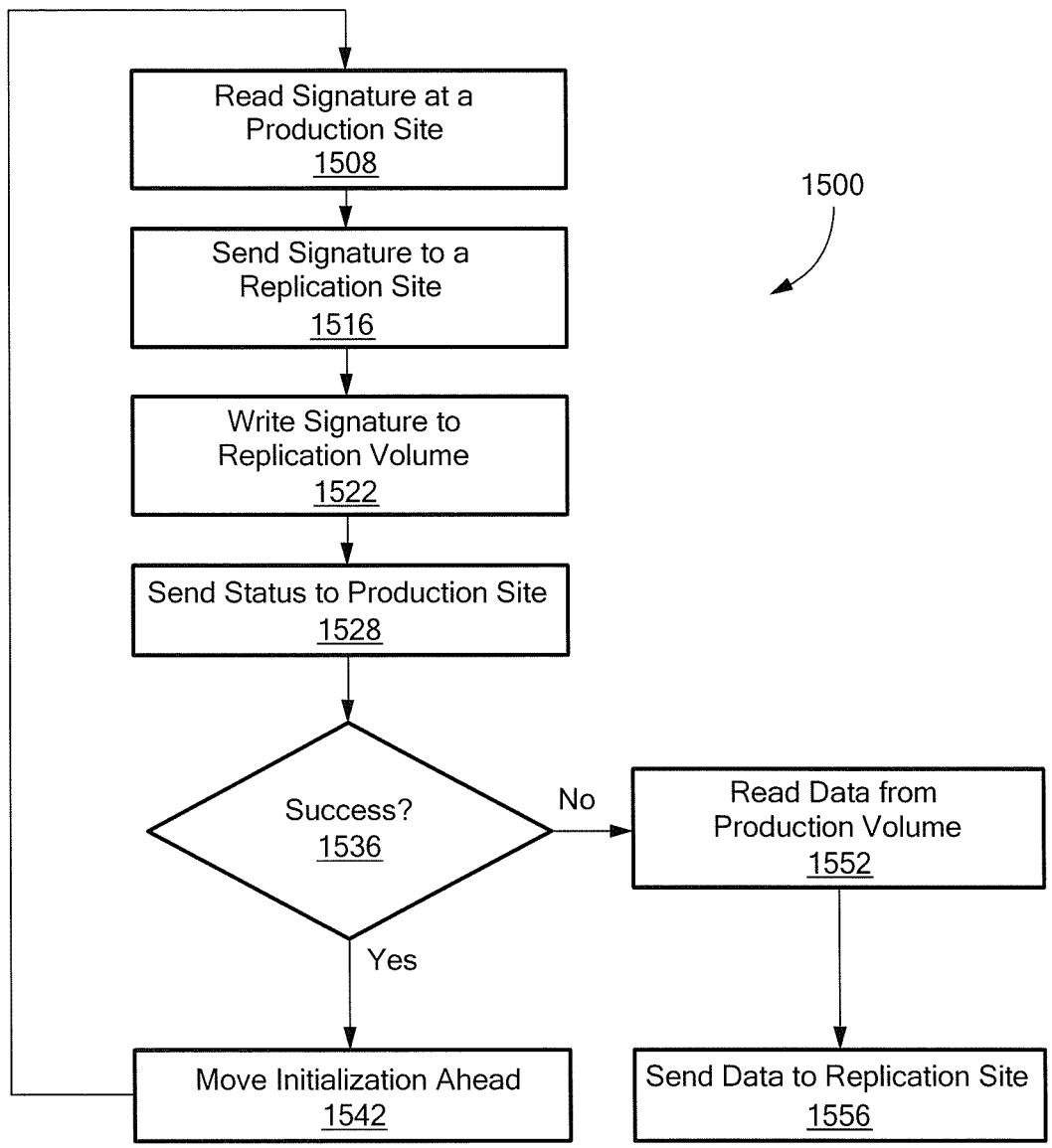
FIG. 17A is a flowchart of an example of a process to synchronize production and replication storage.
Figure 18:
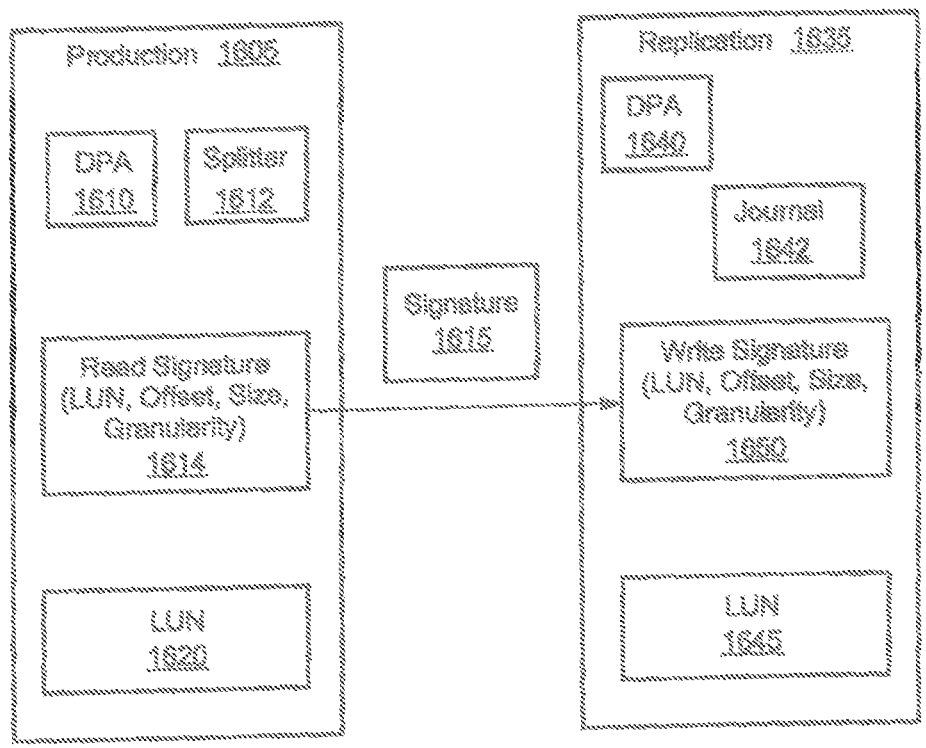
FIG. 18 is a block diagram of an example of a production site executing a write signature command and sending the signature to a replication site.

Referring to FIGS. 17A and 18, a process 1500 is an example of a process to synchronize production and replication storage. For example, a transfer of the data is saved from the production site to the replication site. If a user desires to send 16 blocks of data from LUN X on a production site at offset y to the same offset at LUN Z on the replication site, instead of reading the data and sending it to the replication site, the signature of the data of at the LUN X offset y with 16 block is read from the production site and sent to the replica site. The system will try to write the signature with the signature it read from LUN X to offset y at LUN Z at the replication site.

If the replication site already has data with the same signature then the data is not actually read from the production site and the replication site. Otherwise data at LUN X is read and sent to LUN Z.

The process 1500 reads the signature 1614 from LUN 1620 at a production site 1605 (1508) and sends the signature 1615 to the replication site 1635 (1516). Process 1500 writes the read signature 1614 to the replica LUN 1645 at replication site 535 using write signature command 1650 (1522) and sends a status message to the production site 1605 whether the write was successful or not (1528).

If the write was successful, initialization is moved forward (1542) e.g., the area attempting to be synchronized is already synchronized. For example, if the write signature command is successful (i.e., the data is found with the same signature at the replication site and the data is written to the volume 1645). Thus there is no need to read the data from the production site.

If the write was not successful, data is read from the production LUN 1620 (1552) and sent to the replication site 1635 (1556), where the data is written to the same offset as the offset read at the production site.

Figure 17B:
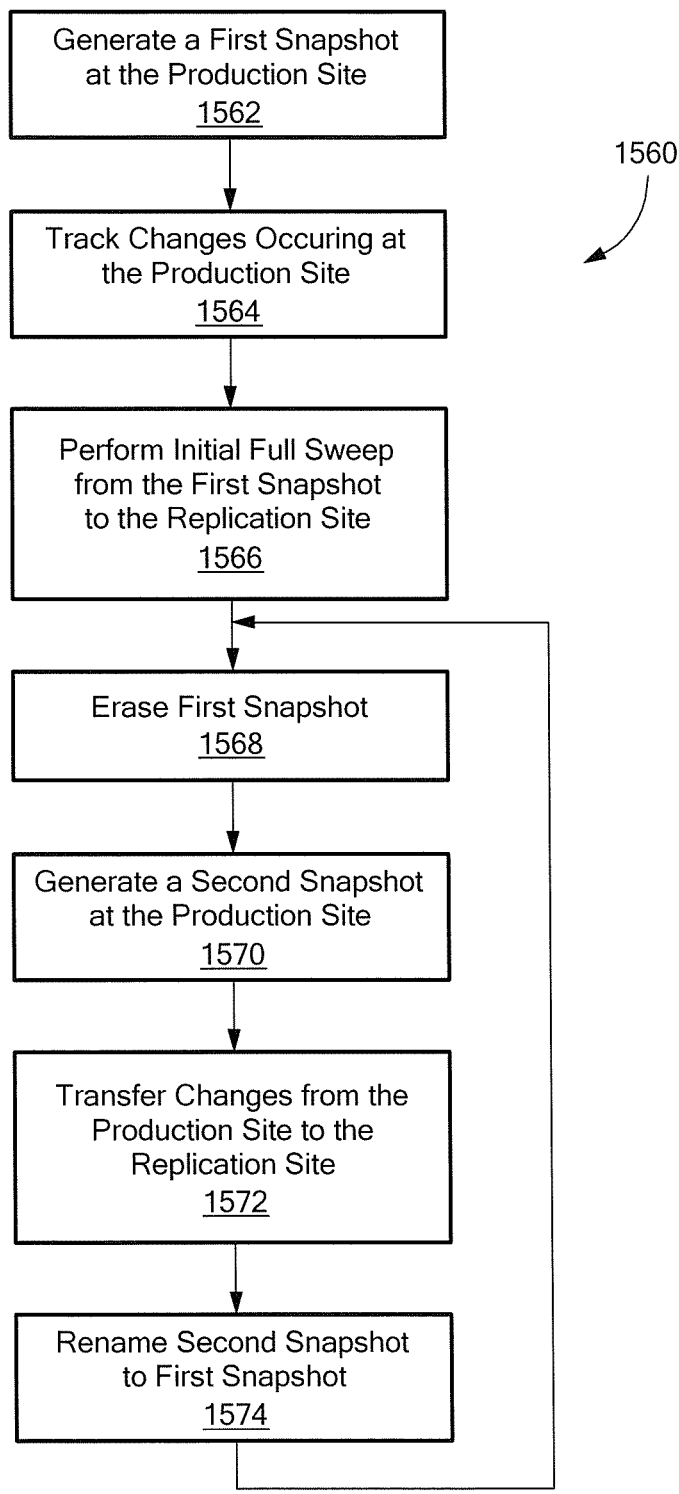
FIG. 17B is a flowchart of an example of a process to use a snapshot shipping mode.

Referring to FIG. 17B, in some other examples, a snapshot shipping mode may be used for asynchronous replication, i.e., taking an array based snapshot at the production site, and shipping the changes from the last snapshot taken at the production site and the last snapshot sent to the replication site. The changes may be sent using the write signature command. In one example, a process 1560 may include generating a first snapshot at the production site (1562) and tracking all changes occurring at the production site (e.g., using a delta marking stream or any other method) (1564). Process 1560 performs an initial full sweep from the first snapshot to the replication site (1566) and erases the first snapshot (1568). Process 1560 generates a second snapshot at the production site (1570) and transfers the changes from the production site to the replication site (i.e., the changes which occurred from the time right before creation of the first snapshot) (1572). Process 1560 renames the second snapshot to be the first snapshot and repeats processing blocks 1568 to 1564. In one example, each session of sending all the changes from the production site to the replication site may use the write signature mechanism, and if the data written to the production volume already exists somewhere on the replication volume no data will need to be transferred from the production volume to the replication volume.

Figure 19:
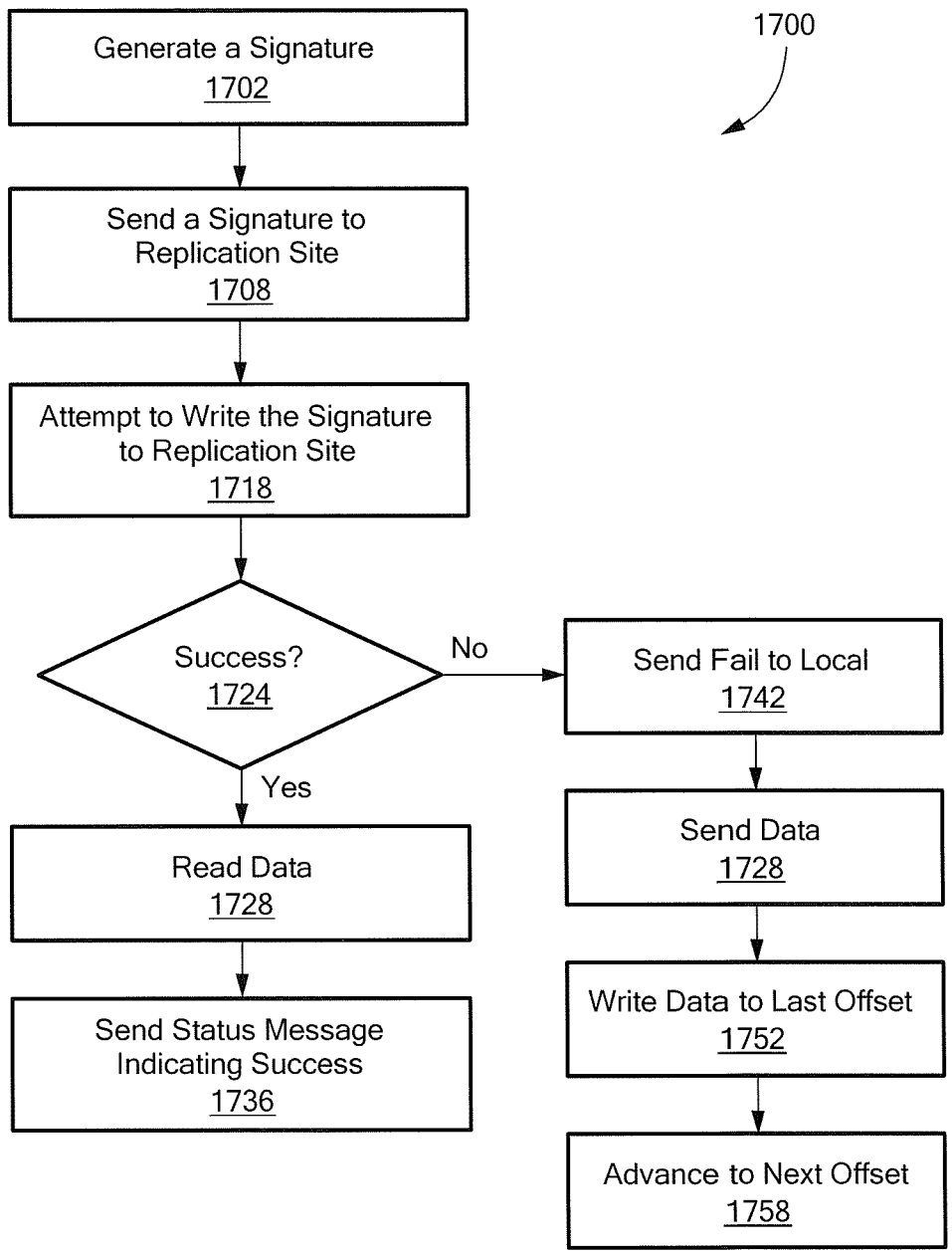
FIG. 19 is a flowchart of an example of a process to leverage a storage system supporting write signature as a device that deduplicated data.

Referring to FIG. 19, a process 1700 is an example of a process to leverage a storage system supporting write signature as a device that deduplicated data over a network (e.g., a wide area network (WAN)). For example, a set of data is sent from a site A (a production site) to a site B (a replication site) and the site B includes a storage supporting write signatures. Process 1700 generates a signature associated with data to be sent from a site A to a site B (1702), and sends the signature to the site B (1708). When the signature arrives at site B, process 1700 attempts to write the signature to a location (e.g., last offset) in the storage volume at site B (1718) and determines whether writing the signature was successful or not (1724).

If writing the signature was successful, the process 1700 reads data (1728) from the location it just tried to write the signature to, and sends a status message to indicate success (1736) (i.e., the data arrived at the replication site successfully).

If writing the signature is not successful, process 1700 sends a message to a local site indicating that writing the signature failed (1742). The original data the production site wanted to send to the replication site is sent to the replication site (1748). When data arrives to the replication site it is written to the last free offset of the replication site storage (so that the signature will be available the next time). Process 1700 advances to the next offset (1758). In one example, the deduplication may be implemented by having one storage LUN at the replication site serve as the data LUN. When a data LUN is full data may be written again from the beginning of the LUN.

In some other examples, there may be a storage supporting write signature commands at both a local and a remote site. The system may know if the signature arrived to the remote storage by checking if the signature is available at the local storage, thus avoiding a second round trip if the signature is not available.

Figure 20:
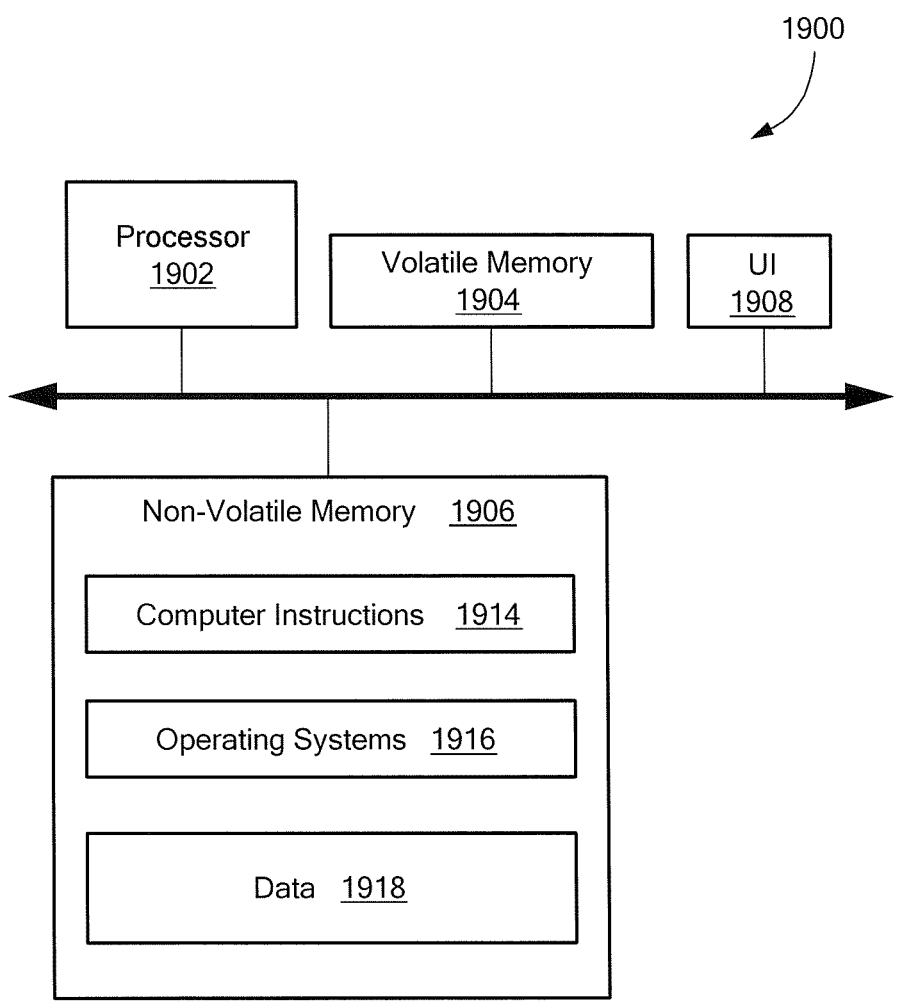
FIG. 20 is a computer on which any of the processes of FIGS. 14, 15A, 15B and 17 may be implemented.

Referring to FIG. 20, a computer 1900 includes a processor 1902, a volatile memory 1904, a non-volatile memory 1906 (e.g., hard disk) and a user interface (UI) 1908 (e.g., a mouse, a keyboard, a display, touch screen and so forth). The non-volatile memory 1906 stores computer instructions 1914, an operating system 1916 and data 1918. In one example, the computer instructions 1914 are executed by the processor 1902 out of volatile memory 1904 to perform all or part of the processes described herein (e.g., processes 1300, 1350, 1400, 1450, 1500, 1560 and 1700).

The processes described herein (e.g., processes 1300, 1350, 1400, 1450, 1500, 1560 and 1700) are not limited to use with the hardware and software of FIG. 19; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes 1300, 1350, 1400, 1450, 1500, 1560 and 1700 are not limited to the specific processing order of FIGS. 13A, 13B, 14A, 14B, 17A, 17B and 19 respectively. Rather, any of the processing blocks of FIGS. 13A, 13B, 14A, 14B, 17A, 17B and 19 may be re-ordered, combined or removed, performed in parallel or in serial, as necessary, to achieve the results set forth above.

The processing blocks (for example, in processes 1300, 1350, 1400, 1450, 1500, 1560 and 1700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
   generating a write signature command, the write signature command having parameters used in execution comprising an offset, a number of blocks of data and a signature, the write signature command configured to:
   write the signature to the offset in a storage array without the data, the signature being a hash value generated using a hash function on the data; and
   enable the storage array to write the data with the same signature to a volume if the data is available at the storage array;
   executing the write signature command to synchronize data between a second site and a first site, executing the write signature command comprising:
   reading a first hash value having a first offset at the first site associated with a block of data at the first site;
   sending the first hash value to the second site;
   using the write signature command with the first hash value received from the first site to determine if there is a block of data stored at the second site associated with the first hash value, wherein the write signature command uses the first hash value to copy a block of data, from a location at the second site indicated in a hash table associated with the first hash value, to a second offset at the second site if the first hash value is found in the hash table;

determining if the write signature command was successful by determining there is the block of data stored at the second site associated with the first hash value; and if the write command is not successful:
reading the block of data from the first site associated with the first hash value; and
writing the block of data from the first site associated with the first hash value to the second offset at the second site, the second offset being equal to the first offset.

2. The method of claim 1, further comprising synchronizing data between a first site and a second site without sending the data from the first site to the second site if the second site already contains data from first site located in any location in the storage array.

3. The method of claim 1, further comprising:
receiving a write at the storage array;
reading a signature for the write;
invalidating a previous hash table entry for the signature;
determining a hash value for the write; and
updating the hash table.

4. The method of claim 3, further comprising:
receiving a write signature command containing a hash value,
searching for hash value in the hash table;
copying the data from the location indicated by the hash table to a location indicated by the write signature command if the hash value is found in the hash table; and
returning a mismatch message if the data is not found in the hash table.

5. The method of claim 1, further comprising:
intercepting a write command;
marking a write in a bitmap as dirty;
reading the data from offset indicated as dirty in the bit map;
calculating a signature for the data; and
adding the signature, for a hash table indicating the signature points to a write offset.

6. The method of claim 5, further comprising:
intercepting a write signature command;
searching for the hash value in the hash table;
copying the data from the location indicated by the hash table to a location indicated by the write signature command if the hash value is found and the hash value of the data indicated by the hash table is identical to the hash value; and
returning a mismatch message if the data is not found or is not identical.

7. The method of claim 1, further comprising using the write signature command to save bandwidth when transferring deduplicated data over a network.

8. The method of claim 7 wherein using the write signature command to save bandwidth when transferring deduplicated data over a network comprises:
generating, at the first site, the first signature associated with data to be sent to the second site;
sending the first signature to the second site;
attempting to write the first signature to a location at a storage LUN at the second site;
reading the data from the location at the storage LUN at the second site if the attempt to write the first signature was successful;
sending a status message indicating success if the attempting to write the first signature was successful;
sending a status message indicating failure if the attempting to write the first signature was unsuccessful;
sending the data from the first site to the second site and writing the data to an offset at the second site if the attempting to write the first signature was unsuccessful.

9. The method of claim 1, further comprising saving bandwidth in a snapshot shipping replication environment.

10. The method of claim 9 wherein saving bandwidth in a snapshot shipping replication environment comprises:
generating a first snapshot at a first site;
tracking changes occurring at the first site;
performing an initial sweep from the first snapshot to the second site;
erasing the first snapshot;
generating a second snapshot at the first site;
transferring the changes from the first site to the second site; and
renaming the second snapshot to be the first snapshot,
where transferring the changes comprises:
reading signatures of the changed locations;
writing signatures to a volume at the replica site using the signatures read at the first site; and
on failure reading the data from the location at the first site and writing the data to the changed locations at the replica site.

11. An article comprising:
a non-transitory machine-readable medium that stores executable instructions, the instructions causing a machine to:
generate a write signature command, the write signature command having parameters used in execution comprising an offset, a number of blocks of data and a signature, the write signature command configured to:
write the signature to the offset in a storage array without the data, the signature being a hash value generated using a hash function on the data; and
enable the storage array to write the data with the same signature to a volume if the data is available at the storage array;
execute the write signature command to synchronize data between a second site and a first site, the instructions causing a machine to execute the write signature command comprising instructions causing a machine to:
read a first hash value having a first offset at the first site associated with a block of data at the first site;
send the first hash value to the second site;
use the write signature command with the first hash value received from the first site to determine if there is a block of data stored at the second site associated with the first hash value, wherein the write signature command uses the first hash value to copy a block of data, from a location at the second site indicated in a hash table associated with the first hash value, to a second offset at the second site if the first hash value is found in the hash table;
determine if the write signature command was successful by determining there is the block of data stored at the second site associated with the first hash value; and if the write command is not successful:
  read the block of data from the first site associated with the first hash value; and
  write the block of data from the first site associated with the first hash value to the second offset at the second site, the second offset being equal to the first offset.

12. The article of claim 11, further comprising instructions causing the machine to synchronize data between a first site and a second site without sending the data from the first site to the second site if the second site already contains data from first site located in any location in the storage array.

13. The article of claim 11, further comprising instructions causing the machine to:
  receive a write at the storage array;
  read a signature for the write;
  invalidate a previous hash table entry for the signature;
  determine a hash value for the write; and
  update the hash table.

14. An apparatus, comprising:
  hardware circuitry to generate a write signature command, the write signature command configured to:
    generate a write signature command, the write signature command having parameters used in execution comprising an offset, a number of blocks of data and a signature, the write signature command configured to:
      write the signature to the offset in a storage array without the data, the signature being a hash value generated using a hash function on the data; and
      enable the storage array to write the data with the same signature to a volume if the data is available at the storage array;
    execute the write signature command to synchronize data between a second site and a first site, the circuitry configured to execute the write signature command comprising circuitry configured to:
      read a first hash value having a first offset at the first site associated with a block of data at the first site;
      send the first hash value to the second site;
      use the write signature command with the first hash value received from the first site to determine if there is a block of data stored at the second site associated with the first hash value, wherein the write signature command uses the first hash value to copy a block of data, from a location at the second site indicated in a hash table associated with the first hash value, to a second offset at the second site if the first hash value is found in the hash table;
      determine if the write signature command was successful by determining there is the block of data stored at the second site associated with the first hash value; and
    if the write command is not successful:
      read the block of data from the first site associated with the first hash value; and
      write the block of data from the first site associated with the first hash value to the second offset at the second site, the second offset being equal to the first offset.

15. The apparatus of claim 14 wherein the circuitry comprises at least one of a processor, a memory, programmable logic and logic gates.

16. The apparatus of claim 14, further comprising circuitry to synchronize data between a first site and a second site without sending the data from the first site to the second site if the second site already contains data from first site located in any location in the storage array.

17. The apparatus of claim 14, further comprising circuitry to:
  receive a write at the storage array;
  read a signature for the write;
  invalidate a previous hash table entry for the signature;
  determine a hash value for the write; and
  update the hash table.

* * * * *